US007006975B1

(12) United States Patent
Dodrill et al.

(10) Patent No.: US 7,006,975 B1
(45) Date of Patent: Feb. 28, 2006

(54) METHODS AND APPARATUS FOR REFERENCING AND PROCESSING AUDIO INFORMATION

(75) Inventors: Lewis D. Dodrill, Richmond, VA (US); Ryan A. Danner, Glen Allen, VA (US); Steven J. Martin, Richmond, VA (US)

(73) Assignee: Cisco Technology, Inc., San Jose, CA (US)

( * ) Notice: Subject to any disclaimer, the term of this patent is extended or adjusted under 35 U.S.C. 154(b) by 168 days.

(21) Appl. No.: 10/660,124

(22) Filed: Sep. 11, 2003

Related U.S. Application Data

(63) Continuation of application No. 09/661,606, filed on Sep. 14, 2000, now Pat. No. 6,643,621.

(51) Int. Cl.
*G10L 15/00* (2006.01)

(52) U.S. Cl. ...................................... 704/275; 709/203

(58) Field of Classification Search ............... 704/275; 345/728; 709/203
See application file for complete search history.

(56) References Cited

U.S. PATENT DOCUMENTS 5,926,789 A * 7/1999 Barbara et al. .......... 704/270.1
6,330,566 B1 * 12/2001 Durham ................... 707/104.1
6,775,687 B1 * 8/2004 Binding et al. ............. 709/203

* cited by examiner

*Primary Examiner*—Daniel Abebe
(74) *Attorney, Agent, or Firm*—Chapin & Huang, LLC; Barry W. Chapin, Esq.

(57) ABSTRACT

Mechanisms and techniques are provided which allow a server computer system, such as a web server, to generate information, such as a web page, which includes an audio resource locator (ARL) configured in accordance with the invention. The ARL includes a reference to audio data, an audio command, and an audio server reference that identifies an audio server computer system that can process the reference to audio data within the ARL according to the audio command within the ARL to producing output, which may be audio or another type of output. The server computer system can serve the information including the ARL to an originator of a request for such information, such as a browser on a client computer system. A client computer system configured with a browser can obtain the information containing the ARL and can reference the ARL which causes the client computer system to send a request to process audio data to the audio server specified in the ARL. The request includes the audio command and optionally an audio output format and the references to audio data in the ARL. An audio server computer system can receive and process such requests by obtaining the audio data identified by the reference(s) to audio data in the request and by obtaining the audio command specified in the request. The audio server computer system then produces output, conforming to the audio output format specified in the request, by processing the referenced audio data in accordance with the specified audio command, thereby offloading audio processing from the browser and the client computer system onto the audio server computer system. Once processed, the audio server computer system can return the output to the client computer system in a format compatible with the client computer system. The ARL of the invention can include complex audio processing command such as merge, compare, convert, mix, sample, concatenate, resample, offset and the like which the audio server computer system is capable of processing when a client references an ARL.

29 Claims, 8 Drawing Sheets

METHODS AND APPARATUS FOR REFERENCING AND PROCESSING AUDIO INFORMATION

CROSS REFERENCE TO RELATED APPLICATIONS

This application is a continuation and claims the benefit of the filing date of U.S. patent application Ser. No. 09/661,606, Filed: Sep. 14, 2000,U.S. Pat. No. 6,643,621, entitled: "METHODS AND APPARATUS FOR REFERENCING AND PROCESSING AUDIO INFORMATION". The disclosure and teachings of which are incorporated in its entirety herein by reference.

FIELD OF THE INVENTION

The present invention generally relates to computer systems that access and process audio data, and more particularly, to mechanisms and techniques that provide an audio resource locator with information which computer systems can process to access audio data and audio data processing capabilities.

BACKGROUND OF THE INVENTION

In conventional computer networks such as the Internet, a suite of software applications and protocols collectively referred to as the "World Wide Web" interoperate to allow web browser software, which typically performs (e.g., executes) on behalf of a user on a client computer system coupled to the network, to obtain information from various web server computer systems distributed throughout the network. Generally, the web browser software requests and obtains the information from the servers using a standardized protocol such as the hypertext transfer protocol (HTTP). The information (i.e., data) is often encoded as a web page.

Web pages are essentially comprised of instructions, data or content, and references to data or content that are collectively encoded or written in a scripting language, such as the hypertext markup language (HTML), the extensible markup language (XML) or an applet language such as Java. Such languages allow web page developers (either people or automated software programs) to create or generate web pages that contain or reference many types of multimedia data such as audio data, graphics data, text data, video data and so forth within the web page. If a web page references data or content, as opposed to literally containing the data or content, such references to data are referred to as uniform resource locators or URLs.

According to a typical operation of the World Wide Web, a user on the client computer system coupled to a network executes a web browser and provides a URL for a web page to the browser. The browser receives the URL and uses a protocol such as HTTP to contact a specific server on the network to obtain the web page referenced by the URL. As the browser receives the web page over the network, the browser is able to interpret the web page (i.e., the HTML and associated data and references to data) and present the web page contents to the user of the browser in a format dictated by the web page.

During the process of interpreting and displaying a web page to a user, a typical browser is configured to recognize certain types of data referenced within the web page via embedded URLs. For example, the web page may reference an audio file (e.g., a WAV file) via an embedded URL. A conventional embedded URL of this sort usually specifies a location of a server on the network (via an address, hostname and/or domain name of that server) where the audio file is stored, as well as a filename and/or a filesystem location (e.g., a directory) that indicates a location of the audio file on that server.

When the browser recognizes an embedded URL that identifies an audio file, the browser automatically references that URL to obtain a copy of that audio file. During this process, the browser invokes a reference to the embedded URL within the web page in order to contact the server that stores the audio file, and then requires the server that stores the audio file to transfer the audio file back to the requesting browser. Once the browser receives the audio file in this manner, the browser causes the client computer system to produce (e.g., play) audio output based on data encoded within the audio file using a plug-in software application.

Generally, an "audio plug-in" or "plug-in" as it is called, operates in conjunction with the browser on the client computer system to audibly reproduce audio data encoded with an audio file to the user of the browser by decoding the audio data. In this manner, a web page can incorporate sound effects such as music, speech or other audible information, which the browser can present to the user once the browser obtains the audio file data referenced within the web page via the embedded URL.

In the case of audio files referenced via URLs as explained above, the browser software may or may not require the use of a plug-in. A plug-in typically incorporates processing logic and decoding algorithms that can read audio file data and reproduce the sound represented by that data. In other words, the plug-in software application understands how to play the audio file data on the client computer system according to the format in which the audio file data is encoded. Since audio decoding processing is often a processor intensive task, audio plug-ins allow the browser software to offload audio file processing to another task (i.e., the plug-in). Audio plug-ins are also helpful since many different audio encoding formats exist and such formats are constantly being updated with newer standards. As such, when a new audio including format becomes popular, the user of a browser can obtain (e.g., via downloading) a plug-in capable of decoding the new format without having to obtain a new version of the browser.

As an example, during development of a web page, a web page designer may create an audio file using a standardized audio encoding format such as MPEG 3 or MP3. The web page designer can incorporate an embedded URL reference to this audio file within the web page. When a user's browser software loads the web page, the browser invokes a reference to the embedded URL for the MP3 audio file in order to begin retrieving the audio file and concurrently attempts to launch (e.g., execute) an MP3 plug-in capable of audibly reproducing the MP3 data from the audio file. If the browser cannot find an MP3-capable plug-in on the client computer system, the browser can prompt the user to download an acceptable MP3-capable plug-in from a server on the Internet. Typically, such plug-ins are free for users to download. Once the user obtains the required MP3 plug-in, the browser can launch the MP3 plug-in which then executes to receive the incoming MP3 audio file data and proceeds to audibly reproduce the audio data encoded in MP3 format in the audio file.

Typically, audio file data is not expressly or literally embedded within a web page due to the amount of space that would be required to store such data in the web page file. Rather, by referencing the audio file within the web page as an embedded URL, the web page file can remain relatively small in size and the audio file can be incorporated, via other embedded URL references, into other web pages as well.

Conventional URLs thus provide a convenient and standardized way to reference multimedia content such as sound, graphics or other types of content within a web page without specifically requiring the actual data (e.g., audio data) to be contained within a web page. As another example, if a web page designer wants to include a graphical image within a web page, the web page designer can embed a URL that references an image file containing the graphical image data. When the browser software loads such a web page and detects the embedded URL, the browser software proceeds to invoke a reference to the URL in order to load the graphical image file and display the image to the user of the browser.

SUMMARY OF THE INVENTION

Conventional information processing techniques such as those explained above suffer, to various extents, from a number of deficiencies. By way of example, conventional techniques for referencing audio data within a web page experience difficulty when multiple audio sources are to be referenced within the same web page.

As a specific example, if a web page designer using conventional techniques incorporates multiple embedded URL references to different audio files within the same web page, a browser that subsequently loads such a web page and attempts to invoke each reference to each embedded URL will experience difficulties since the browser will attempt to launch a separate instance of the plug-in software application designed to audibly reproduce each audio file referenced by each URL on the client computer system. In other words, if a web page contains multiple embedded URL audio file references, the browser will attempt to launch a plug-in for each reference. If each respective plug-in successfully launches and begins to receive the audio file data for its respective URL reference, the plug-ins will collectively experience contention between each other for access to client computer system resources, such as speakers that are required to audibly reproduce the sounds to the user. If each plug-in were able to access the speakers concurrently, each plug-in would begin the process of audibly reproducing the audio file data concurrently and the resulting audio output that the client computer system presents to the user might be unintelligible.

In conventional systems, when a web page contains references to multiple audio files, a conventional browser causes the plug-in for the last-referenced embedded URL (for an audio file) to have priority over the other plug-ins for other audio files previously referenced. That is, conventional browser and plug-in arrangements only present audible output the user of the client computer system for the last URL audio file reference that exists within the web page. Such arrangements do not produce audio output for the URL audio file references incorporated earlier in the web page. In other words, it is difficult using conventional techniques to incorporate multiple references to audio files within a single web page and to have the browser and plug-in software properly operate to play each reference in succession to one another so that the user can hear each of the audio file references.

One possible solution to the aforementioned problem with conventional web-based audio processing that are techniques would be to use scripting techniques within the web page to insert a delay or pause before the browser launches each plug-in to audibly reproduce each audio file. For instance, if a web page is to include embedded URL references to two thirty-second long audio files, the reference to the second of these audio files could be contained as an embedded URL in the web page within a script routine (e.g., a JavaScript routine) that operates to impose a thirty second (or more) delay before launching the plug-in to audibly reproduce the second referenced audio file. Using such a technique, the browser would execute a first instantiation of the audio plug-in immediately upon detecting the first URL reference to the first audio file. The first plug-in would begin to play the audio file data from the first audio file immediately upon receipt of the data. However, before launching the second instantiation of the audio plug-in, the browser would perform, for example, a JavaScript routine which would inject an intentional delay into the processing of the browser before allowing the browser to launch the second instance of the audio plug-in to retrieve and play the second referenced audio file. In this manner, the plug-ins would audibly reproduce the audio files sequentially, one after another, instead of concurrently attempting to do so.

Such a solution to the aforementioned problems is cumbersome and does not account for any delays that may be experienced, for example, when retrieving the audio file over the computer network. In other words, the delay injected into the browser processing by the script routine in order to postpone the production of audible output for the second URL audio reference would only be an estimate based on the length of time that would be required to both obtain, and play, the first audio file by the first instance of the plug-in. If this delay were incorrectly calculated, the browser might attempt to launch the second instance of the plug-in before the first instance of the plug-in was finished audibly reproducing the first audio file data, or, the period of silence may occur if the delay were too long.

Another drawback that exists with conventional approaches to providing audio output via a browser on a client computer system relates to the limited processing capabilities that exist within conventional browsers. Generally, the audio capabilities of computer web browsers are rather limited. For instance, as noted above, a browser typically requires a plug-in to audibly reproduce audio file data. Obtaining the plug-in is a burdensome process to the user of the browser, and plug-in functionality itself is often limited to simple play back of audio data. Little effort has been made to significantly enhance the capabilities of audio plug-ins to provide robust audio processing operations such as those supported by the system of this invention, as explained herein.

As another example, while an HTML "embed" tag that embeds a URL reference to audio data supports limited sound playing capability, it is not possible, using current browser technology, to control the size of the audio files that the browser retrieves, nor is it possible to control the format or type of encoding contained within the audio files referenced in an embedded URL.

To exemplify such a deficiency, consider a situation that might arise when a web page contains an embedded URL reference to an audio file encoded in a new audio encoding technique. For instance, certain computer manufacturers have developed audio encoding techniques which are semi-proprietary. If a browser references a web page containing an embedded URL reference to a proprietarily encoded audio file and the client computer system does not contain a plug-in that can properly decode such a proprietary audio file format for audible reproduction, the user must either download the plug-in that is capable of decoding the proprietary audio file format or the audio file data may be retrieved by the browser but then ignored by the user. If the browser software does not have access to a plug-in that can properly decode the audio file data, the client computer system produces no sound at all for that audio data and the user of the client computer system misses out on the full experience of interacting with the browser with respect to that web page.

The present invention significantly overcomes the aforementioned limitations by providing mechanisms and techniques to allow a web page to contain a reference to audio data referred to herein as an Audio Resource Locator or ARL. An ARL is similar to a URL except that an ARL includes a reference to audio data, an audio command and an audio server reference that identifies an audio server (i.e., a computer system on a computer network) that can process the reference to audio data within the audio resource locator according to the audio command within the audio resource locator to produce an output. The ARL of this invention thus specifies audio data and an audio command to be performed on the audio data, as well as an audio server computer system capable of performing the audio command on the audio data.

The invention also provides an audio server computer system which is capable of receiving a request that is a result of a browser referencing an ARL of the invention. The audio server can parse the request to determine the identity of the audio data referenced by the ARL, and can obtain the audio command within the ARL. The audio server can then perform the audio command on the audio data referenced by the ARL in order to process the audio data. The audio server can produce, for example, audio output that is a result of such processing and can return or serve the audio output back to the computer system (e.g., a client computer system executing a browser on behalf of a user) that referenced the ARL.

As a specific example, the ARL of the present invention can reference an audio server on a computer network (e.g., the Internet) such as "www.audioserver.com" and the ARL can contain an audio command such as "MERGE" and might further contain a reference to audio data in the form of three separate audio files, each of which may exist (i.e., may be stored) in any encoded format on the audio server or within other servers within the computer network. The audio server of the invention can receive a client request based on a reference to such an ARL and can process the MERGE command in order to concatenate or append each of the three separate audio files in sequential order into a single audio file that is then output from the audio server back to the requesting client. The audio command can also optionally specify (e.g., in addition to the MERGE audio command portion) an audio output format to which the output from the audio server should conform in order to be compatible, for example, with the browser or plug-in on the client computer system to which the audio server returns the output. For example, the audio command may specify the MERGE command and may further specify an audio output format such as "WAV" which is a standard and quite popular audio encoding format. The audio command in the ARL might thus appear as "MERGE#WAV", where the audio output format is specified after the "#" delimiter. Such an ARL would cause the audio data files referenced in the ARL to be merged into one audio output file and this file would be in the "wave" file format.

In this manner, the system of the invention provides a robust environment in which audio data can be incorporated into information such as a web page without regard to the specific capabilities of the client computer system, its browser software, or its plug-ins. This is because the ARL identifies the audio data, an audio command, and an audio server that can properly process the audio command on the audio data (as per the command) remotely from the client that actually references or selects (e.g., via a user clicking on the ARL within a web page or via the users browser automatically invoking a reference to the ARL) the ARL. This offloads the actual audio data processing to the remote audio server.

Using the system of the invention, there may be more than one audio server on the computer network to which the client computer system couples. Each different audio server might be tailored to process certain audio data in certain ways. For example, a first audio server might be able to efficiently merge audio files, while another audio server might be equipped with software to compare audio files and provide an output that indicates if they are the same of not. In any event, using the ARL techniques explained herein, a variety of complex audio processing tasks can be specified by an ARL, for example, within a web page, but these actual complex audio processing tasks (e.g., signal processing algorithms to merge, compare, mix, separate, convert, etc.) need not be performed or included (e.g., as a special audio plug-in) on the client computer system or within the web browser. Instead, the client references (e.g. invokes, automatically or otherwise) the ARL (e.g., much like an embedded or user-selectable URL is invoked in a conventional web page) which causes the client to hand-off the audio processing task (specified in the ARL via the audio command) to the specified audio server (indicated in the ARL) which then performs the audio processing task on audio data (also specified in the ARL) and when complete returns the output back to the client.

More specifically, embodiments of the invention provide mechanisms and techniques that include a method for serving information. The method may be performed by a web server, for example, and the information may be a web page. The method includes the steps of receiving a request for information (e.g., a request for a web page) and generating the information. The information includes an audio resource locator that includes i) a reference to audio data, ii) an audio command, and iii) an audio server reference that identifies an audio server that can process the reference to audio data within the audio resource locator according to the audio command within the audio resource locator to produce an output. This method embodiment also includes the step of serving the information including the audio resource locator to the originator of the request for the information. Using this method, a web server can serve a web page that includes ARLs configured according to the invention. When a client (i.e. the browser) references an ARL, audio processing is offloaded from the client computer system to the audio server.

According to another embodiment of the invention, the step of generating includes the steps of determining that the audio resource locator is to be included in the information and dynamically generating the information to include the audio resource locator reference. To this end, this embodiment provides a technique for dynamically generating information, such as a web page, that includes an ARL configured in accordance with the invention.

In another embodiment of the invention, the step of dynamically generating the information includes the steps of determining a type of audio data that is compatible with the originator of the request for the information and selecting the audio command to be included in the audio resource locator. The audio command is selected such that the audio server reference in the audio resource locator can perform the audio command on the reference to audio data (also in the audio resource locator) to produce the output in a format that is compatible with the originator of the request for the information. In other words, according to this embodiment, a web server that generates information such as a web page (either by retrieving a static web page or by dynamically generating a web page) can query and originator of the request for the information, such as a client computer system, to determine a preferred audio output format that is compatible (i.e., for which there is a plug-in) with the originator of the request for the information. The method then selects an audio command to be incorporated into the ARL that includes a specification of this audio output format such that when the information is served to the originator of the request (i.e. the when the web page containing the ARL is provided to the client) and the client references that ARL within that web page, the audio server of the invention will process the ARL (as explained herein) and will return audio output back to the client which is assured to be compatible with a plug-in available on that client.

According to another embodiment of the invention, the audio command to be included in the audio resource locator specifies a conversion operation to convert the reference to audio data in the audio resource locator to audio output that is compatible with the originator the request for the information. As noted above, such an embodiment allows customized creation of ARLs during web page generation such that the audio data that an audio server returns as output in response to a client referencing the ARL is in a format that is compatible with the client. In particular, this embodiment allows the ARL to convert the reference to audio data in one format to audio data in another format. For example, in ARL of the invention may include a reference to audio data in MP3 format and may include a CONVERT audio command that includes an ideal output format specification such as WAV (for .wav files). When a client references such an ARL, the audio server converts the referenced MP3 audio file to WAV format and returns the resulting WAV output to the client.

In yet another embodiment of the invention, the conversion operation specifies an audio output format that is compatible with the type of audio data that is compatible with the originator of the request for information. As noted in the example above, the specification of an audio output format allows the invention to convert audio files from one format to another and offloads this processing to the audio server of the invention.

In yet another embodiment, the step of dynamically generating the information includes the steps of determining a type of audio data that is compatible with the originator of the request for the information and selecting the reference to audio data to be included in the audio resource locator such that the audio server reference in the audio resource locator can perform the audio command on the reference to audio data in the audio resource locator to the output. Also in this embodiment, the output is audio output that is compatible with the originator of the request for the information.

In a further embodiment, the information is a web page and the audio resource locator is embedded within the web page and the step of generating obtains the information containing the audio resource locator from web page storage. Thus in this embodiment, to a web server serves web pages containing ARL's configured according to the invention.

In an additional embodiment, the reference to audio data in the audio resource locator specifies a plurality of audio files and the audio command in the audio resource locator specifies a processing operation that the audio server reference is to perform on the plurality of audio files to produce the output, which is audio output, when the originator of request for the information invokes a reference the audio resource locator. In this manner, this embodiment of the invention allows the ARL to reference multiple audio files that are to be processed by an audio server according to the audio command within the ARL.

In still another embodiment, the audio command is at least one of a merge command, a convert command, a concatenate command, a separate command, a sample command and an offset command. Some of the details of these audio command will be explained further herein. The ARL of this invention can thus specify complex audio processing operations which are to be performed by the audio server of the invention. Since such audio processing is offloaded from the client computer systems using this invention, a browser process on a client computer system, for example, can contain a minimal amount of audio processing capability. In other words, conventional audio processing techniques that provide plug-ins to perform audio processing require advanced functionality within the client computer system. However, the architecture of this invention offloads much of the audio processing tasks to an audio server thereby reducing the amount of logic instructions required within the client computer system. Moreover, the audio tasks supported by this invention are not provided by plug-ins in conventional audio processing systems. This design is beneficial in systems that operate on a thin-client model or in such systems, for example, that use proxy browsers which require stripped-down or bare-bones processing models.

According to another embodiment of the invention, the reference to audio data is a uniform resource locator reference to at least one file of audio data located on a server computer system on a computer network. This method embodiment thus allows an ARL of the invention to reference audio data that can be located anywhere within the computer network.

Other embodiments of the invention relate to methods for obtaining audio server output. Generally, these method embodiments are performed within the client computer system configured in accordance with the invention.

One such embodiment comprises the steps of receiving an audio resource locator that specifies i) a reference to audio data, ii) an audio command and iii) an audio server reference that identifies an audio server that can process the reference to audio data within the audio resource locator according to the audio command within the audio resource locator to produce an output. The method also includes the steps of invoking a reference to the audio resource locator to have the audio server produce the output by processing the reference to audio data according to the audio command specified in the audio resource locator and receiving, from the audio server, the output produced in response to invoking the reference to the audio resource locator. In this manner, the client computer system configured to perform this method can reference the ARL within the information, such as a web page, and can receive output processed by the audio server in response to the client referencing the ARL of the invention.

In another embodiment, the audio resource locator is a uniform resource locator in a web page within a browser on a client computer system, and the step of invoking includes the steps of detecting the presence of the audio resource locator within the web page in the browser and initiating a request to the audio server reference in the audio resource locator according to a data communications protocol. In this embodiment, the request includes a reference to the audio resource locator that includes the reference to audio data and the audio command that the audio server is to perform on the audio data. Accordingly, a client computer system treats the ARL of this invention as if it were a URL, such as an embedded URL, within a web page, by detecting (e.g., automatically in the case of an embedded ARL) and invoking the reference to the ARL.

In another embodiment, the output is audio output and the method further includes the steps of providing the output as audio output received from the audio server in an audible format to a user of the computer system. In this embodiment then, the audio server performs the audio command on the referenced audio data to produce audio output which the client computer system receives and can play to the user of the client computer system. In other embodiments, the output may be logic information that might indicate, for example, a yes or no answer in response to the audio server processing the audio command on the references to audio data in the ARL. For instance, in the case of a COMPARE audio command, which might cause the audio server to compare the contents of to audio data references, the output may be logic information containing true or faults or yes or no indicating if the references to audio data on the same or not.

Other embodiments of the invention relate to methods for producing output from an audio server. Such embodiments are typically performed within an audio server computer system configured in accordance with the invention.

One such method embodiment comprises the steps of receiving, at an audio server, a request to process audio data. The request includes i) a reference to audio data, ii) an audio command, iii) an audio server reference that identifies the audio server. The method also includes the steps of processing the reference to audio data within the request according to the audio command within the request to produce an output and serving the output to an originator of the request. In this manner, in audio server configured to perform such a method can receive, for example, from a client computer system, a request to process audio data based on the client referencing in ARL of this invention. The audio server can then perform the audio command within the request on any references to audio data within the request and can producing output which is returned to the originator of the request, which is the client computer system in this example.

In another embodiment, the step of processing includes the steps of parsing the request to process the audio resource locator to obtain an identity of the audio data and the audio command and obtaining the audio data specified by the reference to audio data and performing the audio command upon the audio data to produce the output. In this manner, the audio server is capable of parsing the request to obtain the intended audio command and the identity of any audio data to which the audio command applies. Using this information, the audio server can then retrieve the audio data in process the audio command on the audio data to produce the output which is then returned to the client.

In another embodiment, the step of obtaining includes the step of determining if the audio data is stored locally, and if so, obtaining the audio data from local storage, and if not, obtaining the audio data via a remote reference to the audio data. According to this embodiment, the audio server is capable of obtaining audio data from local storage war, for example, over a computer network from another server.

In yet another embodiment, the audio command includes a specification of an audio output format and wherein the step of processing performs the audio command on the audio data specified by the reference to audio data to produce audio output in a format compatible with the audio output format. In this manner, the ARL of the invention, when reference by a client, produces a request containing an audio command that, in part, specifies the audio output format that the audio server is required to produce when processing the audio command on the references to the audio data in the request. In this manner, the audio server is able to perform complex audio processing tasks in produce properly format output that the requesting client will be able to bobble reproduce to the user.

In still another embodiment, the request is received at the audio server in response to a client computer system invoking a reference to an audio resource locator that specifies the audio server, the audio command and the reference to audio data. As noted above, the functionality of the audio server of this invention is typically commenced when a client references and ARL of the invention which generates a request sent to the audio server to process the audio command on references to audio data within the request.

In another embodiment, the audio command is at least one of a merge command, a convert command, a concatenate command, a separate command, a sample command and an offset command. As noted above, the audio server of this invention is capable of performing complex audio processing tasks in audio data reference in the request is a result of a client referencing in ARL of this invention.

It is to be understood that the specific audio processing commands such as those listed above are not limiting of this invention, but rather, are illustrative of audio processing tasks which the audio server of this invention can support. As such, other audio processing tasks not listed herein could easily be incorporated as processing logic within the audio server. To this end, an ARL of this invention can reference such audio processing tasks via a command associated with such tasks and can specify references to audio data which the audio server of the invention can use as input to such audio processing tasks. Those skilled in art of audio processing operations should understand that any audio processing operations that can be performed on audio data are eligible to be incorporated into the audio server of this invention. An implementor of this invention can assign respective audio commands to such audio processing capabilities (e.g., COMPARE for a compare audio processing algorithm, MERGE for a merge algorithm, MIX for an audio mixing algorithm, etc.) and the web pages can thereafter incorporate ARL's of this invention which include or contain one or more of these audio commands.

The invention also includes computer systems configured to perform all of the operations of the method embodiments disclosed herein. Such embodiments include a web server computer system configured to perform the methods for serving information as explained herein, as well as a client computer system configured to perform the methods for obtaining audio server output as explained herein, as well as an audio server computer system configured to produce output as explained herein.

More specifically, embodiments of a server computer system, such as a web server, include a server computer system comprising a processor, a memory, an input output mechanism, and an interconnection mechanism coupling the processor, the memory and the input output mechanism. In such embodiments, the memory is encoded with logic instructions that, when performed on the processor, cause the server computer system to serve information by performing the operations of receiving a request for the information from the input output mechanism and generating the information. The information includes an audio resource locator that includes i) a reference to audio data, ii) an audio command, and iii) an audio server reference that identifies an audio server that can process the reference to audio data within the audio resource locator according to the audio command within the audio resource locator to produce an output. The logic instructions also cause the processor to perform the operations of serving the information including the audio resource locator to the originator of the request for the information, via the input output mechanism.

Other embodiments of the server computer system include logic instructions that cause the processor to perform all of the method embodiments related to serving information containing an ARL of the invention, as explained herein.

Other embodiments of the invention relate to a client computer system. Such embodiments include a client computer system comprising a processor, a memory, an input output mechanism and an interconnection mechanism coupling the processor, the memory and the input output mechanism. The memory is encoded with logic instructions that, when performed on the processor, cause the client computer system to obtain audio server output by performing the operations of receiving, via the input output mechanism, an audio resource locator that specifies i) a reference to audio data, ii) an audio command, and iii) an audio server reference that identifies an audio server that can process the reference to audio data within the audio resource locator according to the audio command within the audio resource locator to produce an output. Such embodiments also include logic instructions that, when executed in the processor, cause the client computer system to invoke a reference to the audio resource locator to have the audio server produce the output by processing the reference to audio data according to the audio command specified in the audio resource locator and receive, from the audio server, the output produced in response to invoking the reference to the audio resource locator.

Other embodiments of the client computer system include logic instructions that cause the processor to perform all of the method embodiments related to obtaining audio server output, as explained herein.

Other embodiments of the invention relate to an audio server computer system. Such embodiments include a processor, a memory, an input output mechanism and an interconnection mechanism coupling the processor, the memory and the input output mechanism. The memory is encoded with logic instructions that, when performed on the processor, cause the audio server computer system to produce output by performing the operations of receiving, via the input output mechanism, a request to process audio data. The request includes i) a reference to audio data, ii) an audio command, and iii) an audio server reference that identifies the audio server. Also included are logic instructions that, when performed on the processor, cause the audio server computer system to perform the operations of processing the reference to audio data within the request according to the audio command within the request to produce an output and serving the output to an originator of the request via the input output mechanism.

Other embodiments of the audio server computer system include logic instructions that cause the processor to perform all of the method embodiments related to producing output, such as audio output, as explained herein.

Other embodiments of the invention that are disclosed herein include software programs to perform the operations summarized above and disclosed in detail below. More particularly, a computer program product is disclosed which has a computer-readable medium including computer program logic encoded thereon to provide the methods for performing the tasks associated with the server computer system, the client computer system, and the audio server computer system according to this invention and those associated operations. The computer program logic, when executed on at least one processor within a computing system, causes the processor to perform the operations (e.g., the method embodiments above, and described in detail later) indicated herein. This arrangement of the invention may be provided as software on a computer readable medium such as an optical medium (e.g., CD-ROM), floppy or hard disk or other such medium such as firmware in one or more ROM or RAM or PROM chips or as an Application Specific Integrated Circuit (ASIC). The software, firmware or other such configurations can be installed onto a computer system to cause the computer system to perform the techniques explained herein as the invention.

Another embodiment includes a computer-readable medium including data representations encoded thereon. The data representations include an audio resource locator that includes i) a reference to audio data, ii) an audio command, and iii) an audio server reference that identifies an audio server that can process the reference to audio data within the audio resource locator according to the audio command within the audio resource locator to produce audio output. Essentially, this embodiment is a data structure, that includes data or other information encoded within a computer readable medium such as the magnetic medium (e.g., disk) or electronic medium (e.g., microchip or memory), that represents an ARL as explained herein.

It is to be understood that the system of the invention can be embodied strictly as a software program, as software and hardware, or as hardware alone. Is also to be understood that the audio processing techniques and mechanisms of this invention typically perform (e.g., execute, run, or are otherwise operated) on computer systems coupled to a computer network.

The invention may be embodied in systems, software and/or hardware products designed, developed and/or manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
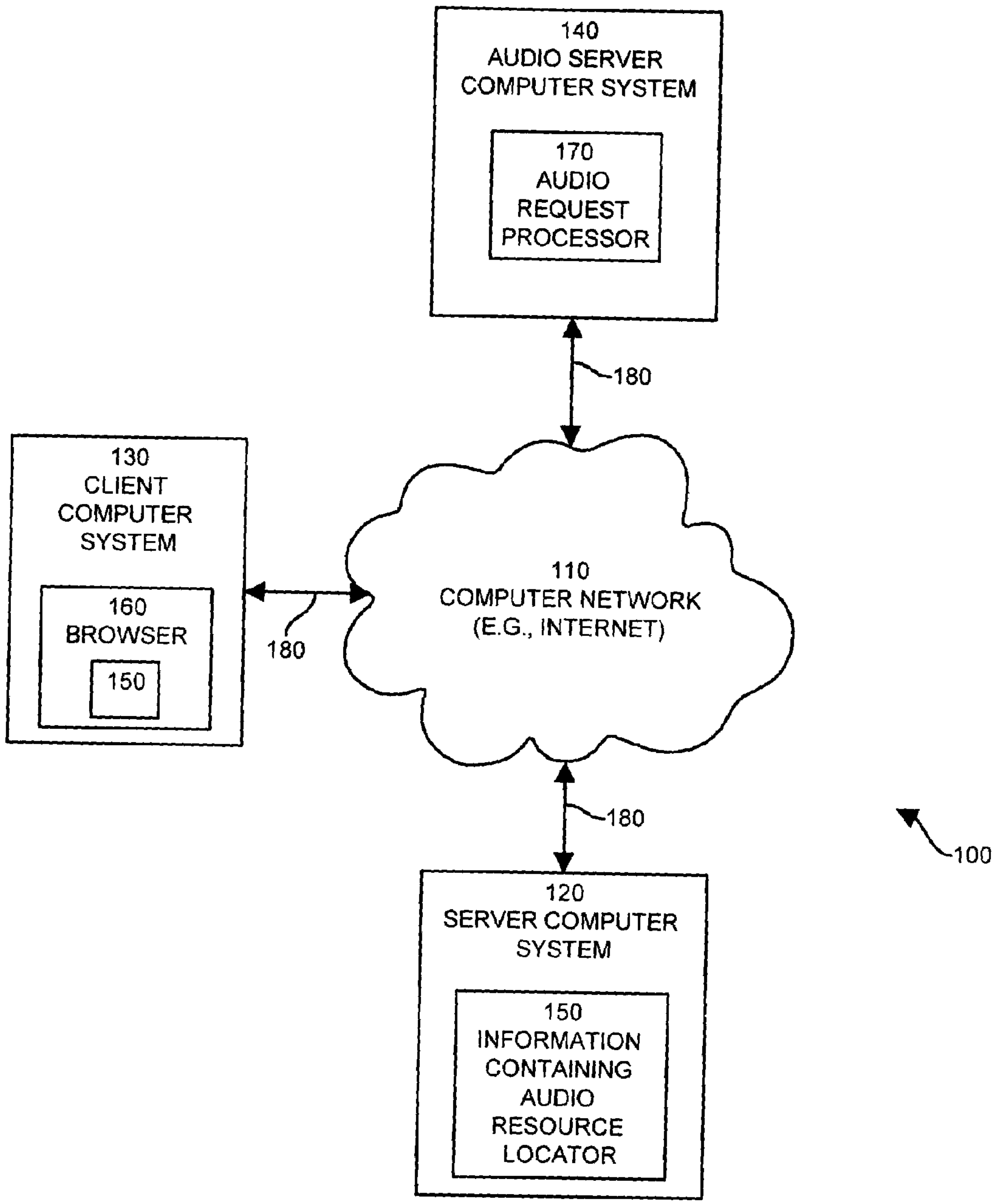
FIG. 1 illustrates an example of a networked computing environment including various computer systems configured to operate in accordance with embodiments of the invention.

Generally, the present invention provides a system to allow information such as a web page to contain a unique reference to audio data. The reference is referred to herein as an Audio Resource Locator or ARL. An ARL is similar to a URL in that a browser or user can reference an ARL. However, an ARL of the invention includes a reference to audio data, an audio command and an audio server reference that identifies an audio server (i.e., a computer system on a computer network) that can process the reference to audio data identified within the ARL according to the audio command identified within the ARL to produce an output. The output contains results of the audio command processing on the audio data, and may be, for example, audio output that the client computer system can audibly reproduce.

The invention also provides an audio server computer system that is capable of receiving a request to process audio data as a result of a browser (i.e., on a client) referencing an ARL of the invention. The audio server can parse the request to determine the identity of the audio data referenced by the ARL and can obtain the audio command within the request. The audio server can then perform the audio command on the audio data referenced by the ARL in order to process the audio data. The audio server can produce, for example, audio output that is a result of such processing and can return or "serve" the audio output back to the requesting computer system (e.g., a browser on a client computer system) that originally referenced the ARL.

As a specific example to illustrate the invention, an ARL can reference an audio server such as "www.audioserver-.com" and the ARL can contain an audio command such as "MERGE" and can further contain a reference to audio data in the form of three separate audio files, which each exist (i.e., are stored) in any encoded audio format on the audio server, or upon another server or servers within the computer network. The audio server can receive a request to process audio data based on a reference (i.e., from a client) to such an ARL and can process the MERGE command in the request in order to concatenate or append together each of the three separate audio files in sequential order into a single audio file that is then output from the audio server back to the requesting client.

The audio command within the ARL can also optionally specify an audio output format to which the output (e.g., audio output) from the audio server should conform in order to be compatible, for example, with a browser or a plug-in on the client computer system to which the audio server returns the output. In this manner, the system of the invention provides a robust audio processing environment in which audio data can be incorporated into information such as web page, without requiring complex audio processing capabilities within the client computer system, browser software, or in plug-ins.

The system of the invention lends itself particularly well to thin-client information processing systems in which, for example, a proxy browser is used as an interface between a computer network such as the Internet (i.e., web servers on the Internet) and thin-client computer system processing devices which contain limited audio processing facilities.

FIG. 1 illustrates a computing system environment 100 that is suitable for use in explaining the high-level operation of embodiments of the invention. The computing system environment 100 includes a computer network 110 such as the Internet which couples, via data links 180, a server computer system 120, a client computer system 130 and an audio server computer system 140. The computer systems 120, 130 and 140 are each configured according to embodiments of the invention.

Specifically, the server computer system 120 includes information 150, which may be a web page for example, that includes an audio resource locator (ARL) as explained herein. In this example, the server computer system 120 generally operates as a web server to serve pages of information, such as information 150, as web pages to other computer systems (e.g., client computer system 130), when these other computer systems request such information over the computer network 110.

The client computer system 130 is configured to operate browser 160 which can request, load and display the information 150 under direction from a user. The browser software 160 may be a conventional web browser software application such as Netscape Navigator manufactured by Netscape Communications Corp. of Mountain View, Calif. or Internet Explorer manufactured by Microsoft Corporation of Redmond, Wash. However, when conventional browser software is configured with information 150 such as a web page that contains an ARL configured according to the invention, it should be understood that the browser software in the client computer system 130 which is configured with such information 150 are considered embodiments of the invention.

Alternatively, the browser 160 may be a proxy browser operating on behalf of the user communicating with the client computer system 130 over computer network 110. In any event, the browser 160 performs the ARL processing as explained herein to retrieve output from the audio server 140 for presentation to the user, whether that user be directly interacting with the client computer system 130 or interacting via a remote device in which case the browser 160 operates as a proxy browser.

Within the client computer system 130, when the browser 160 obtains the information 150 containing an ARL configured according to the invention, the browser 160 invokes a reference to the ARL which causes the client computer system 130 to send a request to process audio data (not shown in FIG. 1), via the computer network 110, to the audio server computer system 140 for processing. The client computer system 130 then awaits for the audio server computer system 140 to process the request to process audio data and return output (not shown in FIG. 1) via the computer network 110 back to the browser 160. The output that the browser 160 obtains in this manner reflects audio processing performed, by the audio server computer system 140 in accordance with an audio command (not shown in FIG. 1) contained within the ARL, on the audio data specified within the ARL. The invention thereby offloads audio processing from the browser 160 on the client computer system 130 to the audio server computer system 140.

The audio server computer system 140 in FIG. 1 is configured with an audio request processor 170. The audio request processor 170, as will be more fully explained, operates to receive requests (not shown in this figure) to process audio data in response, for example, to the browser 160 on the client computer system 130 invoking a reference to the ARL. The audio request processor 170 within the audio server computer system 140 processes a reference to audio data contained within the request according to an audio command also contained within the request to produce an output. The audio server computer system 140 then serves the output to the originator of the request, which in this example is the browser 160 within the client computer system 130. The audio request processor 170 is capable of handling complex audio processing tasks, identified along with the audio data input to such tasks, within the ARL contained (e.g., embedded) in the information 150 (e.g., a web page).

As an example, an ARL of this invention can include an audio command such as MERGE which specifies, to the audio request processor 170, that any audio data references within the ARL are to be merged into a single audio file which is then returned to the browser 160. As another example, the audio command may be a CONVERT command for a conversion operation and may include a specification of an output format. Such a CONVERT audio command causes the audio request processor 170 to convert the audio data identified within the ARL into the specified output format. This conversion enables, for example, the ARL to instruct the audio server computer system to convert an audio file encoded in one particular format to an audio file encoded in another format and return the output of such processing to a client computer system.

As a further illustration of the capability that the system of this invention provides, suppose a web page developer (not shown) is aware that the client computer system 130 is capable of audibly reproducing (e.g., via a plug-in) audio file data only in a specific audio encoding format. Further suppose that the web page developer is in possession of an audio file encoded in another encoding format that is different than that require by the client computer system 130. If the web page developer desires to incorporate an embedded reference to the incompatible audio file into a web page, the web page developer can create the web page (i.e., information 150 in FIG. 1) with an embedded ARL reference that includes: i) a reference to the audio server computer system 140, ii) a reference to the incompatible audio file, and iii) a CONVERT audio command that includes an audio output format specification identifying the encoding format that is required by the client computer system 130.

When the server computer system 120 serves this information 150 as a web page to the client computer system 130 and the browser 160 invokes a reference to this ARL, the audio server computer system 140 activates the audio request processor 170 to perform the CONVERT audio command to transform the reference to the audio file into an encoded audio format that is compatible with the client computer system 130. The audio server computer system 140 then returns an output in the form of an audio file, in the specified audio output format, back to the browser 160.

As these examples illustrate, the system of the invention can perform complex audio processing tasks within the audio server computer system 140 and allows information 150 such as a web page to make use of audio data that might be otherwise unusable to a client computer system 130.

The remainder of this detailed description will present the details of operation of the server computer system 120, the client computer system 130 and the audio server computer system 140, each of which are configured according to embodiments of the invention.

Figure 2:
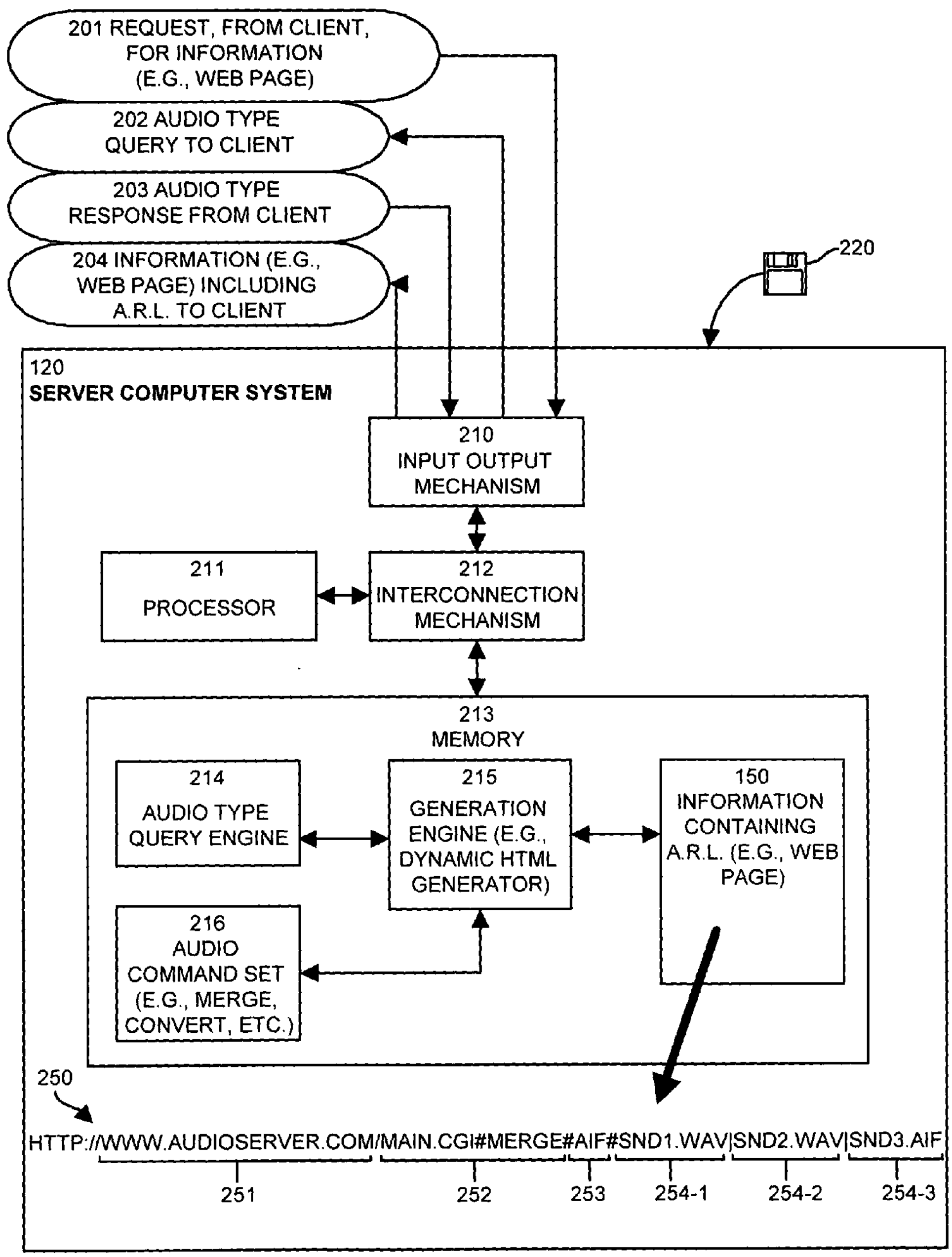
FIG. 2 illustrates an example of a detailed configuration of a server computer system, such as a web server, configured with an ARL in accordance with embodiments of the invention.

FIG. 2 illustrates an example architecture of a server computer system 120 configured in accordance with embodiments of the invention. The server computer system 120 includes an interconnection mechanism 212 which interconnects an input output mechanism 210, a processor 211 and the memory 213. The memory 213 is encoded with information 150, which is a web page in this example, which includes an example ARL 250 configured in accordance with the invention. The memory 213 is also encoded with an audio type query engine 214, a generation engine 215 and an audio command set 216. The example ARL 250 includes an audio server reference 251, an audio command 252, 253, and references to audio data 254-1 through 254-3. Also illustrated in this figure are data communications messages 201 through 204 which contain data exchanged between the server computer system 120 and the client computer system 130 via the computer network 110.

The system of the invention also includes a computer readable medium 220 which contains software to perform the server computer system operations of the invention as explained herein. An administrator (not shown) of the server computer system 120 can load such software from the medium 220 into the memory 213 to configure the server computer system 120 in accordance with this invention.

Generally, in operation of the server computer system 120, the processor 211 executes, interprets, runs or otherwise performs the processing logic of the generation engine 215 and its associated software components 214 and 216 to carry out the techniques of the invention that are related to the server computer system 120.

More specifically, the generation engine 215 within the server computer system 120 is responsible for obtaining or generating the information 150 (e.g., web pages) and serving this information 150 via messages 204 to clients (e.g., 130) in response to receipt of requests 201 from such clients for such information 150. The generation engine 215 may be a dynamic HTML generator program or may simply be a web server program that generates (i.e., retrieves) the information 150 from a storage device (not specifically shown) coupled to or contained within server computer system 120. The audio type query engine 214 is capable of transmitting an audio type query 202 to a client computer system (e.g., 130) to determine what types of audio data are compatible (e.g. can be audibly reproduced) with that client computer system. The audio command set 216 contains a list of available audio commands for use by the generation engine 215 in the event that the generation engine 215 is responsible for dynamically generating information 150 including any required ARLs of this invention.

Before the operation of the server computer system 120 in FIG. 2 is explained in detail, attention is directed briefly to the components 251 through 254 of the example ARL 250 illustrated in this figure.

An ARL configured according to this invention, such as the example ARL 250 in FIG. 2, is expressed in a format that is generally similar to a conventional URL. This example ARL 250 includes an audio server reference 251 preceded by "HTTP://" which indicates that a web browser (e.g., browser 160) can invoke a reference to this ARL 250 using the hypertext transfer protocol (HTTP) to a destination computer system (www. audioserver.com in this example) specified by the audio server reference 251.

Within the example ARL 250, an audio command is specified by two distinct audio command portions 252 and 253 which are separated by a "#" delimiter. The first audio command portion 252 specifies a specific script, operation, program, logic, algorithm or other performable routine, which is "MAIN.CGI" in this example, followed by a specific audio command after the "?" delimiter, which is the "MERGE" command in this example. The script or routine part of the first audio command portion 252 (e.g., MAIN.CGI) designates processing logic that the audio request processor 170 (FIG. 1) within the audio server computer system 140 can use to perform the specific audio command (e.g., MERGE) that appears after the "?" delimiter. In other words, in this example, the audio request processor 170 performs a common gateway interface (CGI) script called MAIN.CGI to perform the MERGE command.

The second audio command portion 253 is optional to the embodiments of this invention and is used to designate a specific audio output format for the output that the audio request processor 170 produces while processing the audio command 252, 253. The second audio command portion which specifies the audio output format in this example is separated by the "#" delimiter after the "MAIN.CGI?MERGE" audio command portion. In this example, the audio output format 253 is designated as "AIF" which stands for Audio Interchange Format. AIF is a standardized audio encoding format. It is to be understood that AIF in used here only as an example, and that other types of output formats can be specified in the audio output format 253 portion of the ARL 250. Some examples might include WAV for ".wav" file format, "MP3" for MPEG3 encoding format, ULAW for u-law encoding, or any other audio or sound encoding or format.

An ARL of this invention also includes one or more references to audio data 254, of which there are three this example ARL 250 that are separated by comma (", ") delimiters. The references to audio data 254-1 through 254-3 designate specific audio files which are to be processed by the audio request processor 170 according to the audio command 252, 253. In this specific example then, the ARL 250 specifies that audio request processor 170 within the audio server computer system 140 is to MERGE the three encoded audio files SND1.WAV, SND2.WAV and SND3.AIF into a single audio output file in the AIF audio encoding format. As will be explained further, the audio server computer system 140 returns this audio output file as output in the AIF format to the browser 160 within the client computer system 130.

Figure 3A:
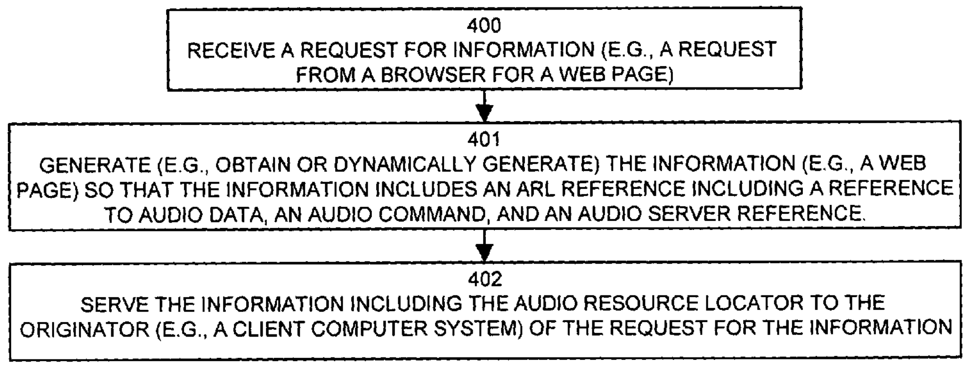
FIG. 3A is a flow chart of high level processing operations performed by a server computer system configured in accordance with embodiments of the invention.

FIG. 3A shows the high-level processing operations 400 through 402 that the server computer system 120 performs according to embodiments of this invention. The discussion of processing steps in FIG. 3A will be given conjunction with reference to the example architecture of the server computer system 120 in FIG. 2.

In step 400, the server computer system 120 receives a request 201 from the client computer system 130 for the information 150 (e.g., a web page) that contains the ARL 250. In operation of a typical embodiment, the server computer system 120 receives the request 201 from a browser (e.g. 160 in FIG. 1) as an HTTP request for a web page.

Next, in step 401, the generation engine 215 within the server computer system 120 generates the information 150 so that the information 150 includes an ARL reference that contains a reference to audio data 254, in audio command 252, 253 and an audio server reference 251. Once the server computer system 120 has generated the information 150 which includes one or more ARLs 250 configured in accordance with the invention, the server computer system 120 performs step 402 to serve, via message 204, the information 150 including the audio resource locator 250 to the originator of the request 201 for the information (i.e., to the requesting client computer system, which is 130 in this example).

In this manner, the server computer system 120 can: i) process requests such as web page requests for information 150 that contains ARLs configured in accordance with the invention, ii) can generate the required information 150, and iii) can serve the information 150 to the requesting client.

Figure 3B:
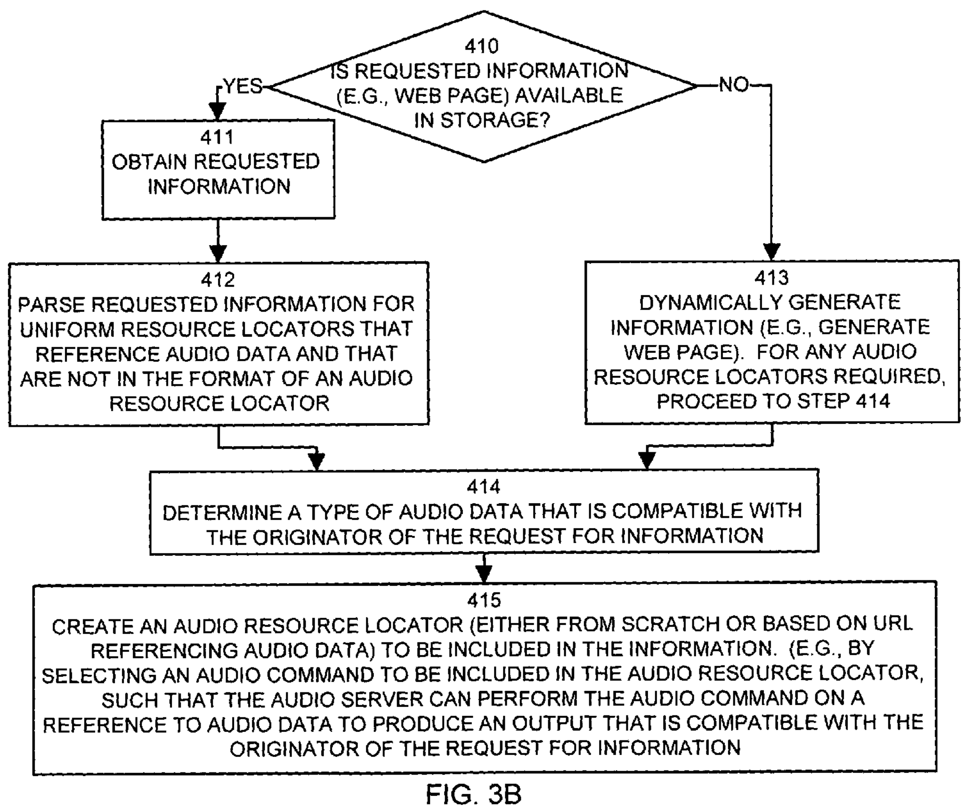
FIG. 3B is a flow chart of processing steps showing the details of generating, within the server computer system, information that includes an ARL in accordance with embodiments of the invention.

FIG. 3B shows processing steps 410 through 415 which generally comprise the generate processing operation that the server computer system 120 performs in step 401 of FIG. 3A according to embodiments of this invention. That is, FIG. 3B shows the details of step 401 in FIG. 3A.

In step 410, the generation engine 215 determines if the requested information 150 (e.g., the requested web page) is available in a storage device (not shown) that is accessible to the server computer system 120. If the requested information 150 is available, for example, as a statically created web page of information 150, then generation engine processing proceeds to perform step 411 to obtain the requested information 150 from storage.

Next, in step 412, the generation engine 215 parses the requested information 150 (e.g., parses the web page) for any uniform resource locator's (URL's) that reference audio data and that are not in the format of an ARL of this invention. In other words, in step 412, the generation engine 215 parses the web page of information 150 to detect any URLs that reference audio data in a format other than the ARL format of this invention. Then, for each such URL detected, the generation engine 215 performs steps 414 can 415 on these URLs, as will be explained.

If, in step 410, the generation engine 215 determines that the requested information 150 is not available in storage and must be dynamically generated, the generation engine 215 proceeds to process step 413 at which point the generation engine 215 dynamically generates the information 150. Generally, dynamic generation of information 150 such as a web page is a known technique. However, this aspect of the invention is directed to the generation or creation of an ARL configured in accordance with embodiments of the invention. During the processing of step 413, if the generation engine 215 is to create a reference to audio data within the web page being dynamically generated, the generation engine 215 proceeds to process steps 414 can 415 to create any required ARLs.

In either the case of existing URLs within static or predefined web pages of information 150 (step 412) or in the case of dynamic generation of web pages of the information 150 (step 413), processing proceeds to step 414 at which point the generation engine 215 determines a type of audio data that is compatible with the originator of the request 201 for information.

In the example embodiment illustrated in FIG. 2, the generation engine 215 can invoke the audio type query engine 214 to initiate an audio type query 202 to the client computer system 130 that provides the initial request 201 for the information 150. The audio type query 202 is a message the server computer system 120 sends to the client computer system 130 to inquire as to the audio formats that are compatible with the browser 160 within the client computer system 130. In response to such a query, the client computer system 130 can return an audio type response 203 to the server computer system 120. The audio type response 203 indicates one or more preferred audio type formats that are compatible the client computer system returning the response (e.g., 130). As will be explained, the generation engine 215 can used such audio formats to designate an audio output format 263 within the ARL under construction.

Next, the generation engine 215 performs step 415 to create an ARL 250 (either from scratch if the information 150 is being dynamically generated as in step 413, or based on an existing URL that references audio data, as is the case with step 412) to be included within the information 150. Step 415 causes the generation engine 215 to construct the ARL (e.g., 250) to include a reference to the appropriate audio server such as "HTTP://WWW.AUDIOSERVER-.COM/." Step 415 also causes the generation engine 215 to create an ARL by selecting an audio command 252, 253 from the audio command set 216 to be included in the ARL.

It is to be understood that the delimiters "?" "#" and "," used in the example ARL 250 are illustrative only and are not meant to be limiting of this invention. As such, any character delimiters can be used, with the general exception that if the ARL (e.g., 250) is to be referenced or used in conjunction with a specific protocol, such as HTTP in this example, the delimiter characters that separate the specific audio command 252 from the audio output format 253 and the audio data references 254 (i.e., that separate the various parts of the ARL) should be selected such that they are compatible with such protocol(s).

The particular selection of an audio command 252, 253 depends upon the purpose of the ARL. In the case of the example ARL 250, the generation engine 215 selects a MERGE command 252 since the intent or objective of the ARL 250 is to merge the references to audio data 254-1 through 254-3. Also in step 415, in the case of dynamic generation, the generation engine 215 selects one or more references to audio data 254 to be incorporated into the web page of information 150. In the case of a static web page containing an existing URL, the identity of the audio data will be defined within the URL and the generation engine 215 only needs to select an audio command to have the audio data processed on the audio server computer system 140, if such processing is desired.

In other words, it may be the case that the information 150 already contains an ARL in the proper format, in which case steps 414 can 415 apply only to ARLs that either need to be created or to existing URLs that must be modified to conform to the ARL format used by this invention. In other words, the various audio commands 252, 253 and references to audio data 254 that the generation engine 215 incorporates into the ARL within information 150 are somewhat specific to the objective that the ARL is to perform when processed by the audio server computer system 140. As such, the generation engine 215 may process steps 412 can 413 in FIG. 3B without requiring the processing of steps 414 and 415 if, in the case of step 412, existing URLs that reference audio data happen to already be in an ARL format of the invention, or, if the audio data 254 which those URLs reference need not be further processed (e.g., converted, merged, mixed, sampled, etc.) by the audio server computer system 140.

In the later case, if an existing web page contains only a single URL that references audio data and that audio data is already in an encoding format that is compatible with the client computer system 130 (to which that information 150 is to be served in response to the request received in step 400), there may be no need to use an ARL of the present invention within that web page of information 150. To this end, embodiments of the invention are directed, for example, to situations in which there are (or are required to be) multiple audio references within a single web page, or to situations where audio referenced within a web page is in a format that is incompatible with the client computer system, or to situations in which audio data requires further or advanced audio processing (e.g., mixing, sampling, etc.) before being presented to the user of the client computer system 130. Such processing would be burdensome to the client computer system 130 and thus the ARL of the invention is a mechanism to offload this processing to the audio server 140.

As will be explained further, since the ARL mechanism of this invention allows many types of audio processing to be specified by the audio command 252, 253, a web page designer may simply create a web page containing an ARL. In such a case, the designer is able to select one or more audio commands from the audio to command set 216 which is/are most appropriate to his or her audio application for use in the ARL. This example ARL 250 specifies a single merge operation. However, other operations such as convert, resample, concatenate, separate, offset, mix and so forth are available for selection by either the generation engine 215 which dynamically converts existing URLs into an ARL format of this invention, or which dynamically creates ARLs from scratch. While the example ARL only illustrates a single audio command MERGE, it is to be understood that an ARL could be constructed to contain multiple audio commands (e.g., each separated by a # delimiter) and that an audio server computer system 140 that processes a reference to such an ARL (as will be explained) can perform the commands on the audio data in the order in which they appear. For example, an ARL might specify both a SAMPLE command and a MERGE command in the audio command portion 252. When such an ARL is referenced (e.g., by the client browser 160), the audio server 140 can sample portions (e.g., the first 5 seconds) of each audio data reference 254 and can then MERGE those samples into a single output (as will be explained).

As explained above, once the server computer system 120 has generated (step 401 in FIG. 3A) the information 150 which includes an ARL 250 in accordance with the invention, the server computer system 120 serves (step 402 in FIG. 3A), via message 204 (i.e., using the HTTP protocol), the information 150 as a web page to the client that requested the information 150 (via request 201).

It is to be understood that the processing of FIG. 3B is given as an example embodiment that illustrates a case of dynamic generation of web pages. The ARL of the invention is equally applicable in situations where web pages are created manually or semi-automatically, in which case step 401 in FIG. 3A entails a web page developer writing or creating a web page to contain an ARL of the format explained herein. That is, one embodiment of the server computer system 120 of the invention is such a server configured with a web page containing an ARL such as ARL 250, or any other ARL of a format as contemplated herein. How the actual ARL gets created in one example embodiment is shown in FIG. 3B, though this is not meant to be limiting and any other type of web page creation mechanisms (e.g., manual coding, or manual use of web page creation tools) can be used to create a web page or other information 150 (e.g., an applet) that contains an ARL of the invention.

Figure 4:
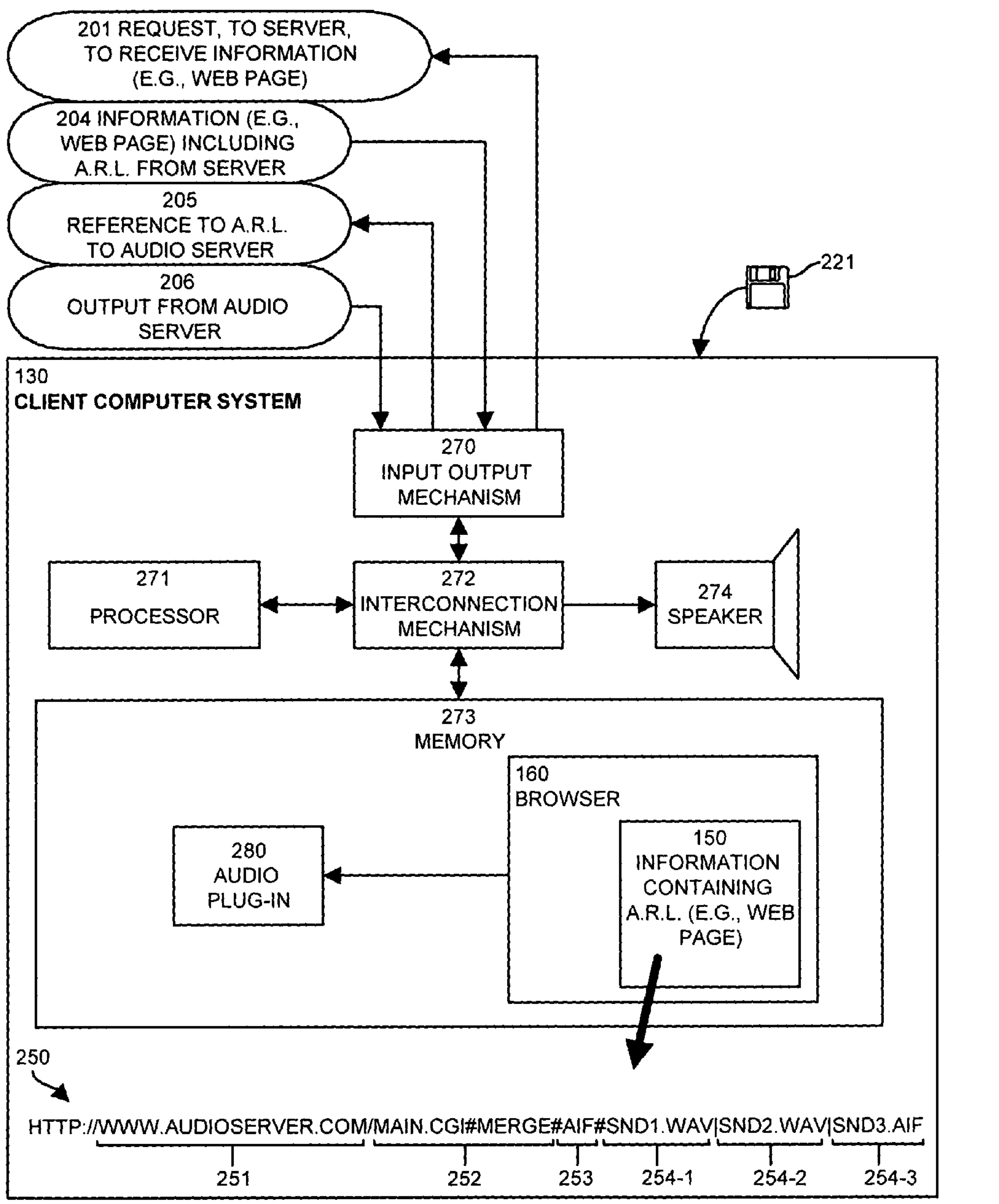
FIG. 4 illustrates an example of a detailed configuration of a client computer system configured with an ARL in accordance with embodiments of the invention.

FIG. 4 illustrates an example architecture of the client computer system 130 configured in accordance with embodiments of the invention. The example client computer system 130 includes an interconnection mechanism 272 which couples an input output mechanism 270, a processor 271, a memory 273 and a speaker 274. The memory 273 is encoded with an audio plug-in 280 and a browser software application 160 which in this example, includes (i.e., has loaded) the information 150 containing the ARL 250 configured in accordance with embodiments of this invention. The functionality and operation of the components of the client computer system 130 will be explained next with reference to the flow chart of processing steps in FIG. 5.

The system of the invention also includes a computer readable medium 221 which contains software to perform the client computer system operations of the invention as explained herein. An administrator (e.g., a user, not shown) of the client computer system 130 can load such software from the medium 221 into the memory 273 to configure the client computer system 130 in accordance with this invention. For example, the medium 221 might contain a web page or other information 150 configured with an ARL of the invention and the user might user the browser 160 to access the medium 221 to obtain the web page of information 150 instead of obtaining such a page of information 150 from the server computer system 120.

Generally, in operation of the client computer system 130, the processor 271 executes, interprets, runs or otherwise performs the processing logic of the browser 160 and the audio plug-in 280 to carry out the techniques of the invention that are related to the client computer system 130.

Figure 5:
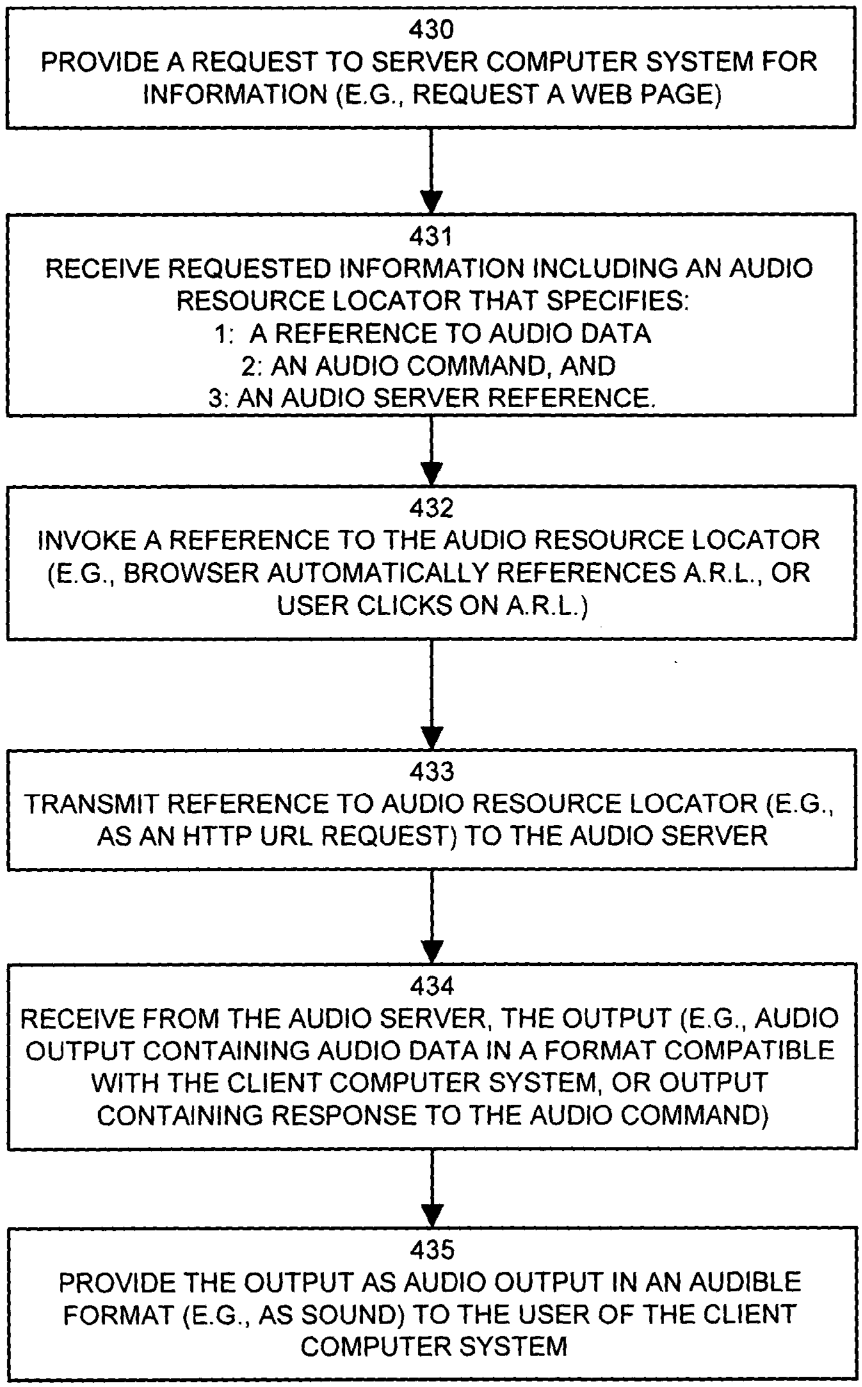
FIG. 5 is a flow chart of processing steps showing the details of processing that a client computer system performs in accordance with embodiments of the invention.

FIG. 5 is a flow chart of processing steps 430 to 435 which show the details of processing as performed by the browser 160 within the client computer system 130. The processing steps in FIG. 5 will be discussed with reference to the example architecture of the client computer system 130 illustrated in FIG. 4.

In step 430, a user (a person, not specifically shown) controls or directs the browser 160 to provide a request 201 for information 150 from the browser 160 in the client computer system 130 onto the computer network 110 to a server computer system (e.g., 120 in FIGS. 1 and 2). The request 201 may be, for example, an HTTP request for a web page of information 150 containing an embedded ARL in accordance with the invention. When a server computer system (e.g., 120) processes the request 201 for information, as explained above with respect to FIGS. 2, 3A and 3B, the server computer system 120 returns one or more messages 204 (e.g. a series of packets formatted according to the HTTP protocol) to the client computer system 130 which contain the web page of information 150 including the ARL 250.

In step 431, the browser 160 receives the requested information 150 including the ARL 250 which specifies a reference to audio data 254, an audio command 252, 253 and an audio server reference 251. The purpose of the various components 251 through 254 of the example ARL 250 have been previously explained.

Upon receipt of the requested information 150 including the ARL 250, in step 432, the browser 160 invokes a reference to the ARL 250 to have the audio server computer system 140 produce an output 206 by processing the reference to audio data 254 according to the audio command 252, 253 specified in the ARL 250. The browser 160 may automatically reference the ARL 250 within the web page of information 150 if the ARL, for example, exists as an embedded ARL, much like a conventional embedded URL is automatically references to retrieve the data which an embedded URL references. That is, once the browser 160 has received and has loaded a web page of information 150 including an ARL of this invention, the browser immediately invokes a reference to the ARL. Alternatively, if the browser 160 is not configured to automatically reference the ARL 250 as an embedded ARL, then the user of the browser 160 may manually "click" (e.g., via a mouse or other input selection mechanism) on the ARL 250 as a hypertext link which causes the browser 160 to perform step 432.

After the client computer system 130 invokes the reference to the ARL in step 432, the client computer system 130 performs step 433 to transmit a reference to the ARL 205 to an audio server (e.g., audio server computer system 140) specified by the audio server reference 251 within the ARL. In other words, the browser 160, in conjunction with the client computer system 130, performs steps 432 in 433, for example, by performing in HTTP POST or GET operation to transmit a request to process audio data 205, that contains ARL components 252 through 254, within an HTTP POST or GET operation to the audio server computer system 140. This processing is similar to the way in which the browser 160 invokes a reference to a conventional embedded URL within the information 150, except to the case of this invention, the browser 160 invokes an embedded reference to the ARL which transmits the audio command 252, 253 and a reference to the audio data 254-1 through 254-3 within the request to process audio data 205 to the audio server computer system 140 for further processing as explained herein.

Next, in step 434, the browser 160 in the client computer system 130 receives the output 206 from the audio server computer system 140. The output 206, may be, for example, audio output containing audio file data in an audio encoding format that is compatible the audio plug-in 280 within the client computer system 130.

In step 435, the browser 160 provides the output 206 to the audio plug-in 280 which provides the output as audio output in an audible format to the user of the client computer system 130 via the speaker 274.

In this manner, the client computer system 130 can receive a web page of information 150 which includes an ARL of this invention and can reference the ARL to have the audio server computer system 140 perform the audio command 252, 253 on the audio data 254 referenced within the ARL 250. The audio server computer system 140 then returns the processed audio data 254 as output 206 which the client computer system 130 receives and can then play via the audio plug-in 280 on the speaker(s) 274 so that the user of the client computer system 130 can hear the audio data associated with embedded ARL within the web page of information 150.

Figure 6:
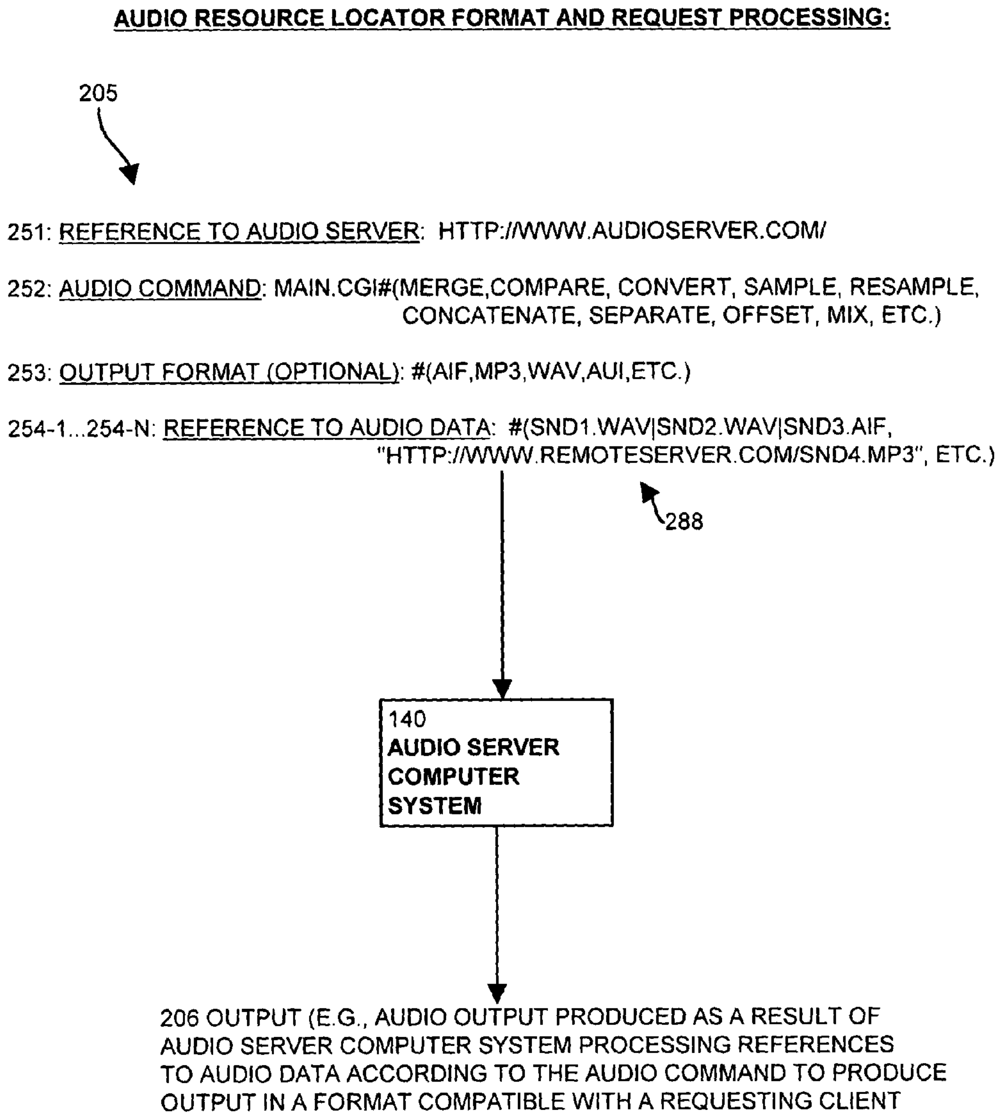
FIG. 6 is a high-level data flow diagram that illustrates processing of a request to process audio data, based on a reference to an ARL, which is input into an audio server computer system to produce output in accordance with embodiments of the invention.

FIG. 6 illustrates the syntax of an ARL within a request 205 to process audio data that a client computer system (e.g., 130) submits to an audio server computer system (e.g., 140)

configured in accordance with the invention. Specifically, the request to process audio data 205 includes a reference 251 to the audio server computer system 140, one or more audio commands 252 which include an optional audio output format 253, and one or more references to audio data 251-1 through 254-N. As shown in this example, there are many types of audio commands 252 that an ARL of this invention can use.

A brief explanation of the various audio commands 252 supported by example embodiments of the invention is provided next. It is to be understood that the actual processing logic or algorithms used to carry out the audio commands 252 on the audio data 254 are known to those skilled in the art. That is, audio processing techniques exist to perform the commands within a computer system using, for example, signal processing or other audio processing techniques.

The MERGE audio command has been discussed above. The COMPARE audio command can, for example, cause the audio server computer system 140 to compare references to audio data 254 to determine if the references are the same or not. In other words, the COMPARE audio command can compare two audio files to see if the audio data that they contain is identical. The compare audio command is an example of an audio command that may cause the audio server computer system 140 to produce an output 206 that contains logic information such as, for example, a yes or no answer, rather than actual audio output. In other words, the output 206 from a COMPARE audio command may be a binary response indicating if the audio data references 254 are the same or not.

The SAMPLE audio command 252, for example, may cause the audio server computer system 140 to return, as output 206, samples of the audio data references 254 specified within an ARL. The RESAMPLE audio command 252 may, for example, cause the audio server computer system 140 to clean up or remove noise from the audio data references 254 within an ARL. The CONCATENATE audio command 252 causes the audio server computer system 140 to seamlessly concatenated together multiple references to audio data. However, unlike the MERGE audio command 252, the CONCATENATE audio command might, for example, remove any periods of silence from the audio data references 254. The SEPARATE audio command may cause the audio server computer system 140 to remove one reference to audio data (e.g., 254-1) from another reference to audio data (e.g., 254-2).

The OFFSET audio command causes the audio server computer system 140 to return, as output 206, the samples of audio data from the references to audio data 254 that are offset from each other by a predetermined amount of time. For example, an audio server computer system 140 configured according to the invention might support audio commands 252 such as OFFSET2, OFFSET10 and OFFSET30. Such commands cause the audio server computer system 140 to return samples of audio data at various time intervals into each reference to audio data 254. For example, the OFFSET2 audio command might cause the audio server computer system 140 to provide a sample of audio data two seconds from the beginning time of a reference to audio data 254, while the OFFSET30 might cause the audio server computer system 140 to provide a sample of audio data thirty seconds from the beginning time of a reference to audio data 254.

The MIX audio command causes the audio server computer system 140 to mix the various references to audio data 254 together in an overlapping manner to produce output 206 which is a combination of all of the references 254. Such a command might be useful, for example, to mix a voice audio data reference 254-1 over a music audio data reference 254-2.

As discussed above, the audio output format 253 specifies an audio encoding format to which the output 206 of the audio server computer system 140 should conform. The audio output format 253 typically specifies an encoding format that is compatible with an audio plug-in 280 that exists within the originator of the initial request 205, which in these example embodiments is the client computer system 130.

In the example request to process audio data 205 as illustrated in FIG. 6, the references to audio data 254-1 through 254-N include a uniform resource locator reference (URL) 288 to a file of audio data located on a server computer system on the computer network 110. Specifically, in this example, this URL audio data reference 288 is HTTP://WWW.REMOTESERVER.COM/SND4.MP3. This aspect of the invention illustrates that a single ARL of this invention can bring together references to audio data that are remotely located from one another. In this case, the audio server computer system 140 is able to use the remote reference 288 to audio data (i.e., the URL reference to an audio data file) to remotely obtain one or more references to audio data 254 within the request 205 to process audio data.

Figure 7:
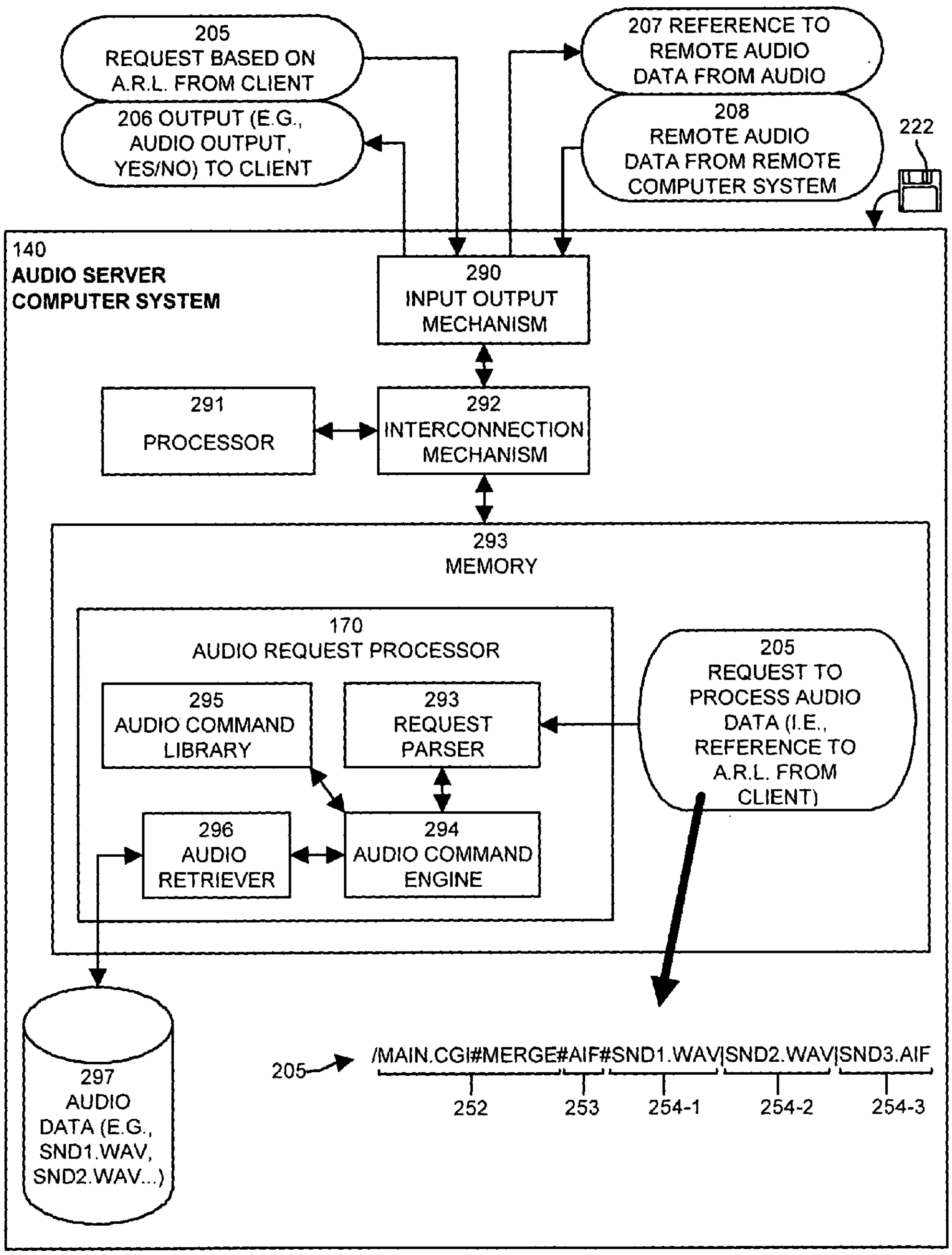
FIG. 7 illustrates an example of a detailed configuration of an audio server computer system configured with a request to process audio data based on an ARL in accordance with embodiments of the invention.

FIG. 7 illustrates an example architecture of an audio server computer system 140 configured in accordance with the invention. The audio server computer system 140 includes an interconnection mechanism 292 which couples an input output mechanism 290, a processor 291 and a memory 293. In this example, the memory 293 is encoded with an audio request processor program 170 that includes a request parser 293, an audio command engine 294, an audio command library 295 and an audio retriever 296. The audio server computer system 140 also includes an audio data storage system 297 which stores audio data files. The audio server computer system 140 sends and receives messages 205 through 208 (as various requests, references, etc.) according to the techniques of the invention as explained herein.

The system of the invention also includes a computer readable medium 222 which contains software to perform the audio server computer system operations of the invention as explained herein. An administrator (not shown) of the audio server computer system 140 can load such software from the medium 222 into the memory 293 to configure the audio server computer system 140 in accordance with this invention. For example, the audio request processor program 170 might be contained on the medium 222 and an administrator can load this program in this manner.

Generally, in operation of the audio server computer system 140, the processor 291 executes, interprets, runs or otherwise performs the processing logic of the audio request processor 170 and its associated software components 293 through 296 to carry out the techniques of the invention that are related to the audio server computer system 140. Also shown in detail within the audio server computer system 140 in FIG. 7 are portions 252 to 254 of the request to process audio data 205 that the audio server computer system 140 receives from the client computer system 130 invoking a reference to the example URL 250 (FIGS. 2 and 4).

Figure 8A:
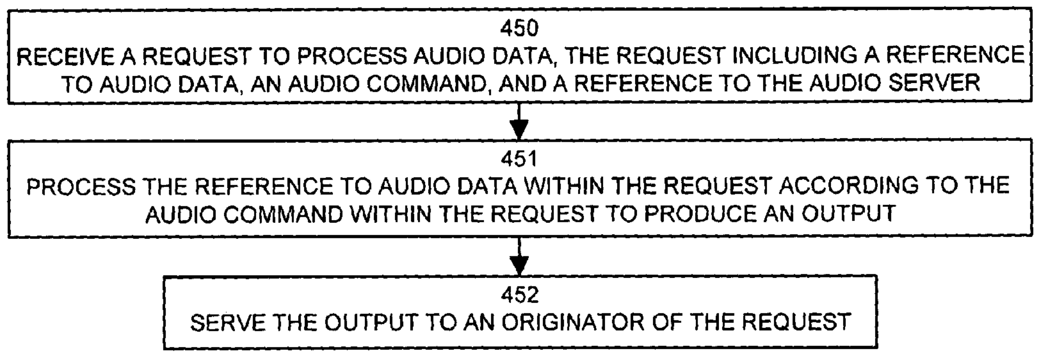
FIG. 8A is a flow chart of high level processing operations performed by an audio server computer system configured in accordance with embodiments of the invention.

FIG. 8A in illustrates high level processing steps 450 through 452 as performed by the audio server computer system 140 in accordance with embodiments of the invention.

In step 450, the input output mechanism 290 within the audio server computer system 140 receives a request to process audio data 205 and the processor 291 places the request 205 in the memory 293 for processing by the audio request processor 170. The request 205 includes at least one reference to audio data 254-1 through 254-3, an audio command 252 (optionally including a specification of an audio output format 253) and a reference to the audio server computer system 140 (i.e., 251 in FIG. 6).

Next, in step 451, the components 293 through 296 of the audio request processor 170 process the reference(s) to the audio data 254-1 to 254-3 within the request 205 according to the audio command 252, 253 within the request 205 to produce output 206. The details of processing which occur within the audio request processor 170 to perform step 451 will be discussed in detail with respect to FIG. 8B. Generally, however, in step 451, the audio request processor 170 processes references to ARLs (e.g., 250) made by client computer systems (e.g., 130) by performing the audio command 252 specified in the request 255 upon the references to audio data 254 to produce an output encoded as specified by the audio output format 253.

Finally, in step 452, the audio server computer system 140 serves the output 206, produced as a result of the audio request processor 170 processing the request 205, to the originator of the request 205, which is the client computer system 130 in this example.

Figure 8B:
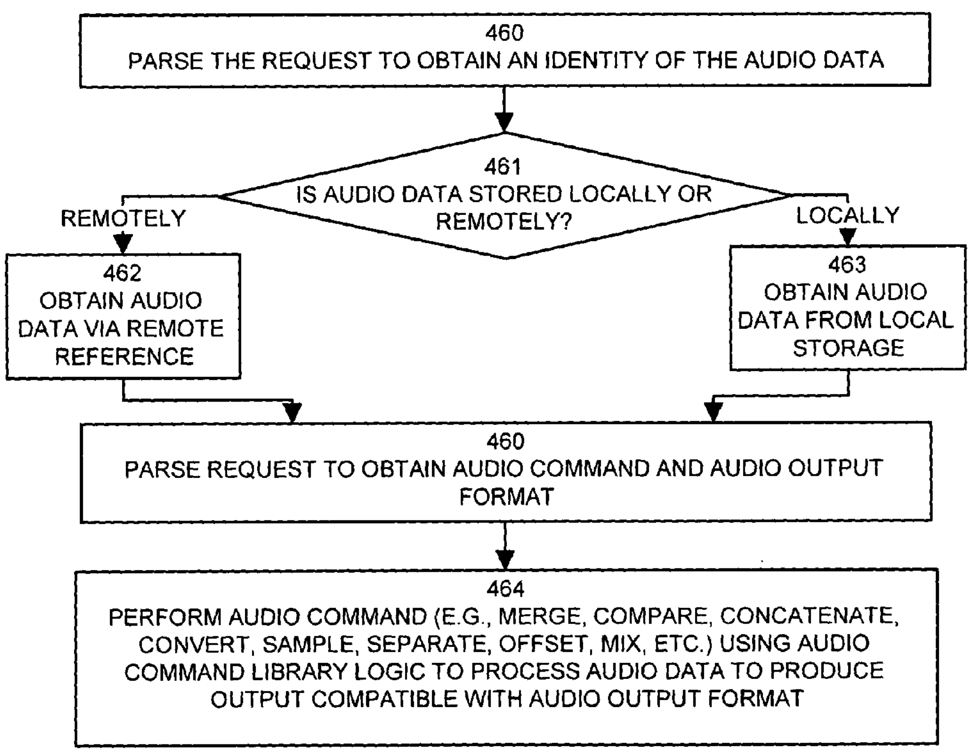
FIG. 8B is a flow chart of processing steps showing the details of processing the request to process audio data within an audio server configured in accordance with embodiments of the invention.

FIG. 8B shows the details of processing step 451 from FIG. 8A.

In step 460, the request parser 293 within the audio request processor 170 detects the presence of the request 205 in the memory 293 and parses the request to obtain an identity of the audio data referenced within the request 205 by the references to audio data 254-1 through 254-N. The identity of the audio data may be a list of filenames, for example, that specify the various audio data files that are to be manipulated by the audio command engine 294 according to the audio command 252 within the request 205.

Next, in step 461, the audio command engine 294 receives the identity of the audio data to be processed in the request 205 and determines if the audio data is stored locally, such as within the audio data storage device 297, or remotely, such as on another server computer system (not specifically shown) on the computer network 110 (FIG. 1).

The audio command engine 294 can make the determination if audio data is stored locally in step 461 by determining if audio files listed in the identity of the audio data parsed from the request 205 in step 460 appear in a catalog of audio data files that the audio data storage device 297 maintains locally within the audio server computer system 140. The audio command engine 294 can also easily determine that a specific reference to audio data is a remote reference if that reference is in a URL format such as the URL reference to audio data 288, as previously discussed with respect to FIG. 6.

If the audio data is stored remotely, the audio command engine 294 performs step 462 to obtain the audio data via a reference 207 (e.g., an HTTP GET or POST operation) to the URL reference to the remote audio data (e.g., 288 in FIG. 6) stored on another computer system to the computer network 110.

If the audio data is stored locally, the audio command engine 294 performs step 463 to obtain the audio data locally from the audio data storage device 297. While not shown in these figures, a web page designer or developer can upload audio data files into the audio data storage device 297 within the audio server computer system 140 once a web page of information 150 is made available to client computer systems on the computer network 110.

In either the case of obtaining the audio data remotely (step 462) or obtaining the audio data locally from local storage (step 463), once the audio command engine 294 obtains the audio data, the audio command engine 294 performs step 460 to further parse the request 205 to obtain the audio command 252 and the audio output format 253.

Next, the audio command engine can process step 464 to perform the audio command 252 using audio command library logic 295 to process the audio command 252 upon the identified audio data (identified and obtained in steps 460 through 463) to produce output 206 that is compatible with the audio output format 253. In the example request 205, step 464 causes the audio command engine 294 to access a MERGE command routine or logic within the audio command library 205 which performs a merge operation on the identified audio data files SND1.WAV, SND2.WAV, SND3.AIF (254-1 through 254-3) to produce output audio data in the AIF encoding format, as specified by the audio output format 253.

In this manner, the audio server computer system 140 can receive requests 205 to process audio data based on invocations of ARLs on client computer systems and can processes these requests 205 to produce output data 206. Depending upon the audio command 252, 253 within the request 205, the output data 206 may contain audio output which is returned to the client computer system that originated the request 205 (e.g., for play back to a user of that client computer system), or the output 206 may contain logic information such as a yes or no response to the audio command 252. The output 206 might contain a yes or no response, for example, if the audio command were a compare command in which case the audio request processor 170 would compare the contents of two or more audio files (identified by references to audio data 254-1 through 254-N) to determine if they were the same or not.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for serving information, the method comprising:

receiving a request for information from a client;

processing the request by generating an information page;

constructing a reference identifying retrievable audio data associated with the information page, the reference being customized depending on attributes of the client requesting the information; and serving the information page including the reference over a network to the client, wherein constructing the reference includes:

transmitting a message to the client inquiring what type of audio format is compatible with a browser at the client; and receiving a response from the client indicating at least one audio format supported by the browser at the client.

2. A method as in claim 1, wherein constructing the reference further includes:

based on the response, providing command information in a data field of the reference to identify an audio format supported by the browser at the client.

3. A method as in claim 2, wherein the client displaying the served information page retrieves the retrievable audio data based on the reference embedded in the information page and wherein the command information in a data field of the reference identifies a format for serving the retrievable audio data to the client.

4. A method as in claim 1, wherein the reference includes a data field identifying an audio server capable of serving the retrievable audio data.

5. A method as in claim 4, wherein the reference may be invoked by the client according to Hypertext Transfer Protocol (HTTP).

6. A method as in claim 1, wherein generating the information page includes:

retrieving an information page associated with the requested information;

parsing the information page for a URL (Uniform Resource Locator) that references corresponding audio data; and enabling the client to retrieve the audio data via use of the reference instead of the URL by including the constructed reference in the served information page in lieu of the URL that references corresponding audio data.

7. A method as in claim 1, wherein the reference further includes a data field to store an identifier of a corresponding audio data file associated with the retrievable audio data.

8. A method as in claim 1, wherein the reference includes:

i) an audio command; and ii) identification of an audio server capable of serving the audio data to the client according to the audio command.

9. A method as in claim 1, wherein constructing the reference includes:

determining a type of audio data that is compatible with the client requesting the information; and selecting an appropriate audio command for inclusion in the reference so that an audio server, upon receiving an audio request from the client, serves the audio data in a format compatible with the client.

10. A method as in claim 9, wherein the audio command is chosen from the group of commands including: MERGE, CONVERT, CONCATENATE, SEPARATE, SAMPLE, and OFFSET.

11. A method as in claim 1, wherein the reference is a string of text including data fields for identifying: a) a location of the audio data associated with the reference, and b) a preferred format for transmitting the audio data to the client.

12. An apparatus for serving information, the apparatus comprising:

a processor;

a memory;

an input output mechanism; and an interconnection mechanism coupling the processor, the memory and the input output mechanism;

wherein the memory is encoded with logic instructions that, when performed on the processor, cause the apparatus to serve information and perform the operations of:

receiving a request for information from a client;

processing the request by generating a web page;

constructing a reference to a location of audio data associated with the web page, the reference being customized depending on attributes of the client requesting the information; and serving the web page including the reference over a network to the client, wherein when constructing the reference, further performs operations of:

transmitting a message to the client inquiring what type of audio format is compatible with a browser at the client; and receiving a response from the client indicating at least one audio format supported by the browser at the client.

13. An apparatus as in claim 12 that, when constructing the reference, further performs operations of:

based on the response, providing command information in a data field of the reference to identify an audio format supported by the browser at the client.

14. An apparatus as in claim 13, wherein the client displaying the served web page retrieves the audio data based on the reference included in the web page served to the client; and wherein the command information identifies a format for serving the audio data to the client.

15. An apparatus as in claim 12, wherein the reference includes a data field identifying an audio server capable of serving the audio data.

16. An apparatus as in claim 12, wherein the reference may be invoked by the client according to Hypertext Transfer Protocol (HTTP).

17. An apparatus as in claim 12 that, when generating the web page, further performs operations of:

retrieving web page information associated with the requested information;

parsing the web page information for a URL (Uniform Resource Locator) that references corresponding audio data; and enabling the client to retrieve the audio data use of via the reference instead of the URL by including the constructed reference in the served web page in lieu of the URL that references corresponding audio data.

18. An apparatus as in claim 12, wherein the reference further includes a data field to store an identifier of a corresponding audio data file associated with the audio data.

19. An apparatus as in claim 12, wherein the reference includes:

i) an audio command; and ii) identification an audio server capable of serving the audio data to the client according to the audio command.

20. An apparatus as in claim 12 that, when constructing the reference, further performs operations of:

determining a type of audio data that is compatible with the client requesting the information; and selecting an appropriate audio command for inclusion in the reference so that an audio server, upon receiving request from the client, serves the audio data in a format compatible with the client.

21. An apparatus as in claim 20, wherein the audio command is chosen from the group of commands including: MERGE, CONVERT, CONCATENATE, SEPARATE, SAMPLE, and OFFSET.

22. An apparatus as in claim 12, wherein the reference is a string of text including data fields for identifying: a) a location of the audio data associated with the reference, and b) a preferred format for transmitting the audio data to the client.

23. A server computer system comprising:

means for receiving a request for information from a client;

means for processing the request by generating a web page;

means for constructing a reference identifying retrievable audio data associated with the web page, the reference being customized depending on attributes of the client requesting the information; and means for serving the web page including the reference over a network to the client, wherein when constructing the reference, further performs operations of:

means for transmitting a message to the client inquiring what type of audio format is compatible with a browser at the client; and means for receiving a response from the client indicating at least one audio format supported by the browser at the client.

24. A computer program product including a computer-readable medium having instructions stored thereon for processing data information, such that the instructions, when carried out by a processing device, enable the processing device to perform the steps of:

receiving a request for information from a client;

processing the request by generating an information page;

constructing a reference identifying retrievable audio data associated with the information page, the reference being customized depending on attributes of the client requesting the information; and serving the information page including the reference over a network to the client, wherein when constructing the reference, further performs operations of:

transmitting a message to the client inquiring what type of audio format is compatible with a browser at the client; and receiving a response from the client indicating at least one audio format supported by the browser at the client.

25. A method of supporting retrieval of data over a network, the method comprising;

at a first server, parsing an information page for network address information associated with retrievable data; and at the first server, instead of serving the information page including the network address information to a client:

converting the network address information into a locator reference that includes a first field identifying a data format supported by the client; and serving the information page including the locator reference to the client, enabling the client to retrieve the retrievable data based on use of the locator reference.

26. A method as in claim 25, wherein the locator reference is a string of text that includes a second field identifying a network address of a second server from which to retrieve the data.

27. A method as in claim 25 further comprising:

transmitting a message to the client inquiring what type of data format is compatible with a browser at the client; and receiving a response from the client indicating at least one data format supported by the browser at the client.

28. A method as in claim 27 further comprising:

based on the response from the client, providing command information in a data field of the reference to identify a data format supported by the browser at the client.

29. A method as in claim 25, wherein the reference may be invoked by the client according to Hypertext Transfer Protocol (HTTP).

* * * * *